United States Patent
Wang (10) Patent No.: US 11,256,640 B2
(45) Date of Patent: Feb. 22, 2022

(54) FILE TRANSFER METHOD, APPARATUS, DEVICE BETWEEN BMCS AND STORAGE MEDIUM

(71) Applicant: ZHENGZHOU YUNHAI INFORMATION TECHNOLOGY CO., LTD., Henan (CN)

(72) Inventor: Xuelong Wang, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 362 days.

(21) Appl. No.: 16/475,108

(22) PCT Filed: Dec. 26, 2018

(86) PCT No.: PCT/CN2018/123673
§ 371 (c)(1),
(2) Date: Jun. 30, 2019

(87) PCT Pub. No.: WO2019/233088
PCT Pub. Date: Dec. 12, 2019

(65) Prior Publication Data
US 2021/0334229 A1     Oct. 28, 2021

(30) Foreign Application Priority Data
Jun. 4, 2018  (CN) .......................... 201810564497.8

(51) Int. Cl.
G06F 13/36      (2006.01)
G06F 13/362     (2006.01)

(52) U.S. Cl.
CPC .... G06F 13/362 (2013.01); *G06F 2213/0016* (2013.01)

(58) Field of Classification Search
CPC .................. G06F 13/362; G06F 2213/0016
See application file for complete search history.

(56) References Cited

U.S. PATENT DOCUMENTS 10,101,963 B2 * 10/2018 Thomas ................ G06F 13/404
10,864,108 B2 * 12/2020 Moavenian ............ A61F 5/445
(Continued)

FOREIGN PATENT DOCUMENTS

CN    101577698 A    11/2009
CN    102289402 A    12/2011
(Continued)

OTHER PUBLICATIONS

International Search Report for PCT/CN2018/123673 dated Mar. 27, 2019.
(Continued)

*Primary Examiner* — Henry Tsai
*Assistant Examiner* — Christopher A Daley
(74) *Attorney, Agent, or Firm* — Yue (Robert) Xu; Apex Attorneys at Law, LLP (57) ABSTRACT

A file transfer method between BMCs is provided, to implement file transfer from a master BMC to a slave BMC. Firstly, a file to be transferred to the slave BMC is obtained. Then a communication connection with the slave BMC is established through an I2C bus. After the communication connection is established, the file is divided into multiple sub-files to meet transmission requirements of an IPMI. Finally, the sub-files are read, and the sub-files are sent to the slave BMC, so that the slave BMC combines the sub-files to obtain the file. A file transfer apparatus, device between BMCs and a storage medium corresponding to the method are further provided.

9 Claims, 4 Drawing Sheets

(56) References Cited

U.S. PATENT DOCUMENTS

| | | | | |
|---|---|---|---|---|
| 2013/0039207 A1* | 2/2013 | Vadasz | ............... | H04L 49/1584 |
| | | | | 370/252 |
| 2014/0195669 A1 | 7/2014 | Bhatia et al. | | |
| 2015/0178095 A1 | 6/2015 | Balakrishnan et al. | | |
| 2017/0116103 A1* | 4/2017 | Cencini | ............... | H04L 67/1042 |
| 2017/0364375 A1* | 12/2017 | Ku | ..................... | G06F 9/44505 |
| 2018/0018240 A1* | 1/2018 | Thomas | ................ | G06F 11/302 |
| 2018/0052881 A1* | 2/2018 | Arumugham | ....... | G06F 16/2365 |
| 2019/0260820 A1* | 8/2019 | Hess | ....................... | G06F 3/067 |
| 2020/0184077 A1* | 6/2020 | Venkataraman | ...... | G06F 21/575 |

FOREIGN PATENT DOCUMENTS

| | | |
|---|---|---|
| CN | 102346717 A | 2/2012 |
| CN | 106959935 A | 7/2017 |
| CN | 107153558 A | 9/2017 |
| CN | 107193594 A | 9/2017 |
| CN | 109032979 A | 12/2018 |

OTHER PUBLICATIONS

First Office Action dated Dec. 18, 2020 for Chinese patent application No. 201810564497.8, English translation provided by Unitalen.

* cited by examiner

FILE TRANSFER METHOD, APPARATUS, DEVICE BETWEEN BMCS AND STORAGE MEDIUM

The present application is a National phase application of PCT international patent application PCT/CN2018/123673, filed on Dec. 26, 2018 which claims priority to Chinese Patent Application No. 201810564497.8, titled "FILE TRANSFER METHOD, APPARATUS, DEVICE BETWEEN BMCs AND STORAGE MEDIUM", filed on Jun. 4, 2018 with the Chinese Patent Office, both of which are incorporated herein by reference in their entireties.

FIELD

The present disclosure relates to the technical field of BMCs, and in particular to a file transfer method, apparatus, device between BMCs and a storage medium.

BACKGROUND

A board manager controller (BMC) is configured to achieve important functions of a server, such as asset information display, hardware monitoring, heat dissipation regulation, system configuration, remote monitoring, log collection, fault diagnosis, and system maintenance. Due to the increasing complexity of functions of the server, one BMC is unable to meet current requirements. Therefore, in the conventional technology, the number of BMCs is appropriately increased according to the functions of the server. For example, one BMC may be added, and practically, multiple BMCs may be added. In a case that there are at least two BMCs in the server, one BMC is a master BMC, and the remaining BMC is a slave BMC. The master BMC is configured to monitor and manage functions of the server, and the slave BMC monitors only some devices and has only a part of functions of the master BMC. With such design, difficulty in hardware design and the cost are reduced, and hardware of other product can be better reused. All information display of the slave BMC and operations performed by a user on the slave BMC are implemented by the master BMC, because the slave BMC does not include a network interface for the user to access. Such network interface is included in the master BMC. Currently, the communication between the master BMC and the slave BMC is implemented through an Inter-Integrated Circuit (I2C) bus.

The communication between the master BMC and the slave BMC is performed through the I2C bus, which is applicable to common communication data. However, when file transfer is to be performed between the master BMC and the slave BMC, for example, when it is required to upgrade the firmware of the slave BMC, it is required to transfer an image file from the master BMC to the slave BMC. The existing I2C bus communication cannot realize file transfer, resulting in that the firmware of the slave BMC cannot be upgraded.

It can be seen that a problem to be urgently solved by those skilled in the art is how to implement file transfer from the master BMC to the slave BMC.

SUMMARY

The present disclosure aims to provide a file transfer method, apparatus, device between BMCs, and a storage medium, to implement file transfer from a master BMC to a slave BMC.

In order to solve the above technical problem, a file transfer method between BMCs, which is applied to a master BMC, is provided in the present disclosure. The method includes:

obtaining a file to be transferred to a slave BMC;

establishing a communication connection with the slave BMC through an I2C bus;

dividing the file into multiple sub-files to meet transmission requirements of an IPMI; and reading the sub-files and sending the sub-files to the slave BM, so that the slave BMC combines the sub-files to obtain the file.

Preferably, the obtaining a file to be transferred to a slave BMC includes: obtaining a file to be transferred to the slave BMC from a memory buffer.

Preferably, the establishing a communication connection with the slave BMC through an I2C bus includes:

establishing a communication session with the slave BMC through the I2C bus; and sending a test command on the IPMI to the slave BMC to determine that the communication connection with the slave BMC is successfully established.

Preferably, the dividing the file into multiple sub-files includes: dividing the file by taking 128 bytes as a unit to obtain the multiple sub-files.

Preferably, the reading the sub-files and sending the sub-files to the slave BMC includes:

reading a first sub-file and sending the first sub-file to the slave BMC;

determining whether a return value from the slave BMC is received;

determining whether there is a remaining sub-file if the return value is received;

reading a next sub-file, sending the next sub-file to the slave BMC, and determining again whether a return value from the slave BMC is received, if there is a remaining sub-file; and ending if there is no remaining sub-file.

In order to solve the above technical problem, a file transfer apparatus between BMCs, which is applied to a master BMC, is further provided in the present disclosure. The apparatus includes: an obtaining unit, an establishing unit, a dividing unit and a sending unit.

The obtaining unit is configured to obtain a file to be transferred to a slave BMC.

The establishing unit is configured to establish a communication connection with the slave BMC through an I2C bus.

The dividing unit is configured to divide the file into multiple sub-files to meet transmission requirements of an IPMI.

The sending unit is configured to read the sub-files, and send the sub-files to the slave BMC, so that the slave BMC combines the sub-files to obtain the file.

In order to solve the above technical problem, a file transfer device between BMCs is further provided in the present disclosure, which includes a memory and a processor.

The memory is configured to store a computer program. The processor is configured to execute the computer program to implement the file transfer method between BMCs as described above.

In order to solve the above technical problem, a computer readable storage medium is further provided in the present disclosure. The computer readable storage medium stores a computer program, and the computer program is executed by a processor to implement the file transfer method between BMCs as described above.

In order to solve the above technical problem, a file transfer method between BMCs, applied to a slave BMC, is further provided in the present disclosure. The method includes:

responding to a request for establishing a communication connection sent by a master BMC through an I2C bus;

receiving, by an IPMI, multiple sub-files sent by the master BMC, where the multiple sub-files are obtained by dividing a file to be transferred to the slave BMC; and combining the multiple sub-files to obtain the file.

In order to solve the above technical problem, a file transfer apparatus between BMCs, applied to a slave BMC, is further provided in the present disclosure. The apparatus includes: a responding unit, a receiving unit and a combining unit.

The responding unit is configured to respond to a request for establishing a communication connection sent by a master BMC through an I2C bus.

The receiving unit is configured to receive, through an IPMI, multiple sub-files sent by the master BMC, where the multiple sub-files are obtained by dividing a file to be transferred to the slave BM.

The combining unit is configured to combine the multiple sub-files to obtain the file.

The file transfer method between BMCs according to the present disclosure is used for implementing file transfer from a master BMC to a slave BMC. Firstly, a file to be transferred to the slave BMC is obtained; then a communication connection with the slave BMC is established through an I2C bus; and the file is divided into multiple sub-files to meet transmission requirements of an IPMI after the communication connection is established. Finally, the sub-files are read, and the sub-files are sent to the slave BMC, so that the slave BMC combines the sub-files to obtain the file. Since the file is divided such that each of the sub-files satisfies the transmission requirements of the IPMI, the file can be transferred without a network interface. In addition, since the I2C bus and the IPMI originally exist, it is unnecessary to improve the hardware, thereby greatly saving costs.

In addition, the file transfer apparatus, device between BMCs and the storage medium according to the present disclosure also have the beneficial effects as described above.

BRIEF DESCRIPTION OF THE DRAWINGS

In order to illustrate embodiments of the present disclosure clearer, the drawings to be used in description of the embodiments of the present disclosure are briefly described hereinafter. Apparently, the drawings in the following descriptions show only some embodiments of the present disclosure, and other drawings may be obtained by those skilled in the art based on the provided drawings without creative efforts.

DETAILED DESCRIPTION

Hereinafter technical solutions in embodiments of the present disclosure are described clearly and completely in conjunction with the drawings in embodiments of the present disclosure. Apparently, the described embodiments are only some rather than all of the embodiments of the present disclosure. Any other embodiments obtained based on the embodiments of the present disclosure by those skilled in the art without any creative effort fall within the protection scope of the present disclosure.

The core of the present disclosure is to provide a file transfer method, apparatus, device between BMCs, and a storage medium, to implement file transfer from a master BMC to a slave BMC.

In order to make those skilled in the art better understand the technical solutions of the present disclosure, the present disclosure is further described in detail in conjunction with the drawings and embodiments hereinafter.

Figure 1:
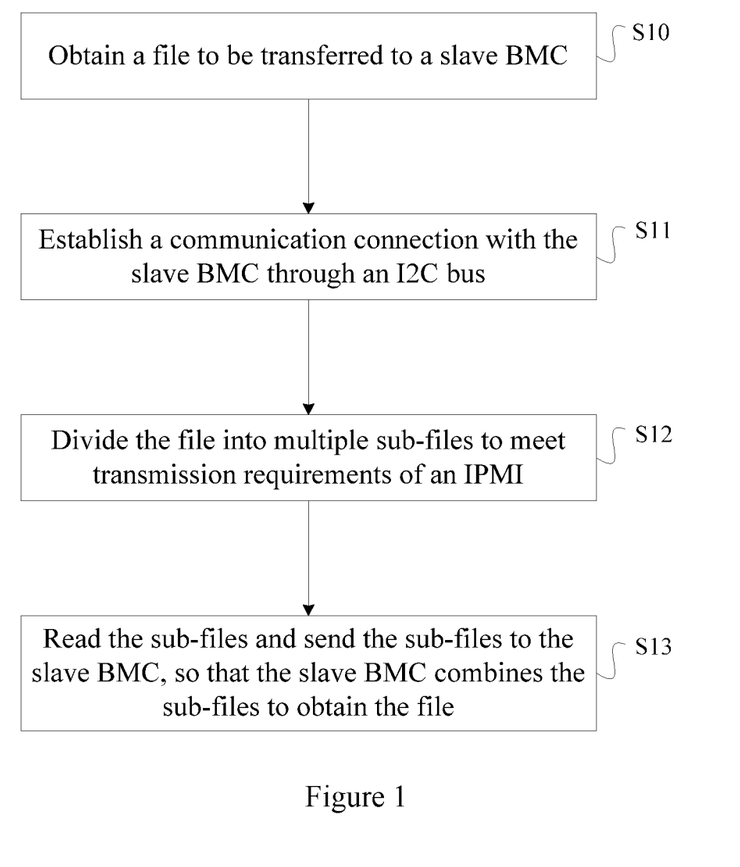
FIG. 1 is a flowchart of a file transfer method applied to a master BMC according to an embodiment of the present disclosure.

FIG. 1 is a flowchart of a file transfer method applied to a master BMC according to an embodiment of the present disclosure. As shown in FIG. 1, the method includes steps S10 to S13.

In S10, a file to be transferred to a slave BMC is obtained.

It should be noted that, a type of the file in this embodiment is not limited, and the file may be an image file. The image file is mainly used to upgrade firmware of the slave BMC. The manner for upgrading the slave BMC after the slave BMC obtains the image file is well known to those skilled in the art, and is not described in the embodiment.

The master BMC has a network interface for the user to access. Therefore, when a file is to be transferred to the slave BMC, for example, when the firmware of the slave BMC is to be upgraded, the user needs to upload the image file used by the slave BMC to the master BMC, specifically to a directory (such as /var/rom.ima) of the master BMC, and read the image file into a memory buffer of the master BMC by using a file reading function fread.

In S11, a communication connection with the slave BMC is established through an I2C bus.

Currently, the master BMC is connected to the slave BMC through the I2C bus. In an embodiment, the connection is established only when the master BMC needs to communicate with the slave BMC.

In a preferred embodiment, step S11 includes:

establishing a communication session with the slave BMC through the I2C bus; and sending a test command on an IPMI to the slave BMC to determine that the communication connection with the slave BMC is established successfully.

IPMI (Intelligent Platform Management Interface) is an open standard hardware management interface specification. In which, a specific method is defined for an embedded management subsystem for communication. The IPMI has two main advantages: first, such configuration allows an out-of-band server management; and second, the operating system is unnecessary to transmit system state data. The test command herein is sent through the IPMI. The test command is mainly used to determine whether the communication connection between the master BMC and the slave BMC is successful.

In S12, the file is divided into multiple sub-files to meet transmission requirements of the IPMI.

According to the transmission requirements of the IPMI, the number of bytes of data transmitted at one time cannot exceed 128, that is, at most only 128 bytes can be transmitted each time. However, one file usually has bytes more than 128. Therefore, the file is required to be divided into multiple sub-files, so that the number of bytes in each sub-file does not exceed 128. It can be understood that the number of bytes included in different sub-files may be the same or different. For example, if a file has 1000 bytes, the file may be divided into 8 sub-files. Each of the first 7 sub-files has 128 bytes, and the last sub-file has 104 bytes.

It should be noted that, after a file is divided into multiple sub-files, the slave BMC is required to combine the sub-files. Therefore, the sub-files have an order. In a preferred embodiment, the sub-files are transferred successively according to an order of the sub-files in the file.

In S13, the sub-files are read and sent to the slave BMC, so that the slave BMC combines the sub-files to obtain the file.

In an implementation, after obtaining the sub-files, the slave BMC stores the sub-files sequentially in its memory buffer. After all of the sub-files are obtained, the slave BMC writes all of the sub-files in the memory buffer to a directory (such as /var/rom.ima) of a system by using a file writing function fwrite, thereby obtaining the file.

The file transfer method between BMCs according to the embodiment of the present disclosure is used for implementing file transfer from a master BMC to a slave BMC. Firstly, a file to be transferred to the slave BMC is obtained; then a communication connection with the slave BMC is established through an I2C bus; and the file is divided into multiple sub-files to meet transmission requirements of the IPMI after the communication connection is established. Finally, the sub-files are read, and the sub-files are sent to the slave BMC, so that the slave BMC combines the sub-files to obtain the file. Since the file is divided such that each of the sub-files satisfies the transmission requirements of the IPMI, the file can be transferred without a network interface. In addition, since the I2C bus and IPMI originally exist, it is unnecessary to improve the hardware, thereby greatly saving costs.

Based on the foregoing embodiment, in a preferred embodiment, the process of dividing the file into multiple sub-files in step S12 includes: dividing the file, by taking 128 bytes as a unit, to obtain multiple sub-files.

For the file division, one may refer to the above description. In fact, the division manner described above is only one of the division manners. The specific calculation process is as follows.

According to i=size of (buffer)/128 (the total number of bytes of the file is divided by 128 to get a quotient), the number of times i for cyclic reading is calculated; and according to j=size of (buffer) %128 (the total number of bytes of the file is divided by 128 to get a remainder, the number of bytes j of the last sub-file, which contains less than 128 bytes, is calculated.

Since i and j are calculated in advance, the master BMC can determine whether all of the sub-files are sent to the slave BMC based on i and j.

Figure 2:
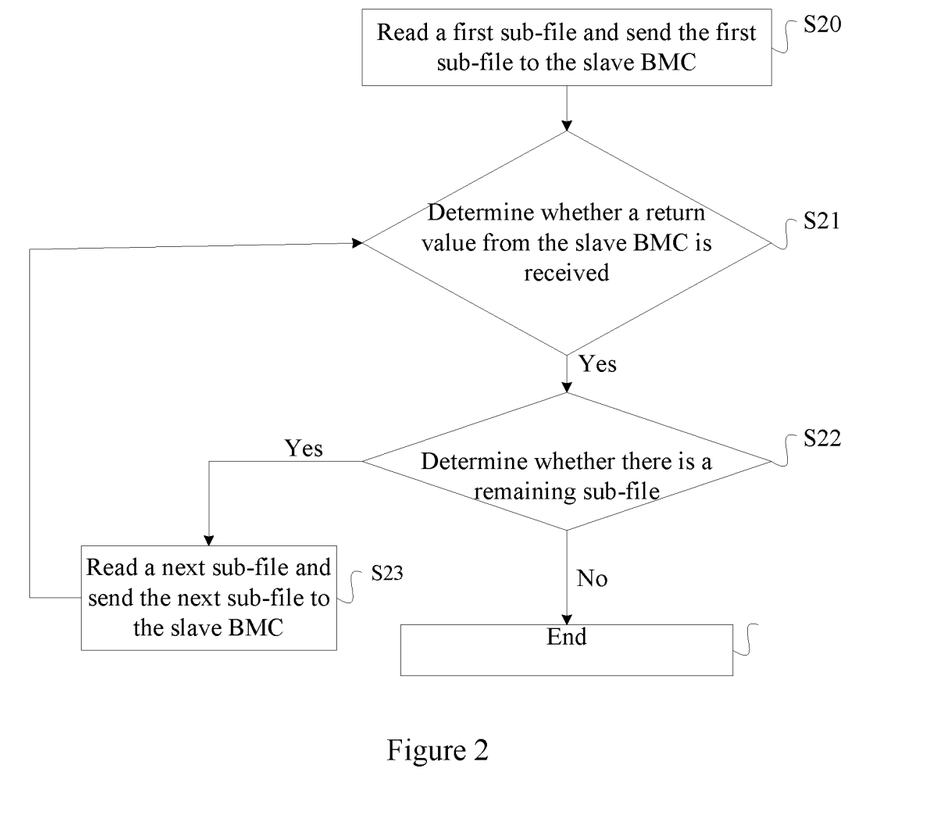
FIG. 2 is a flowchart showing sending sub-files from a master BMC to a slave BMC according to an embodiment of the present disclosure.

FIG. 2 is a flowchart showing sending sub-files from a master BMC to a slave BMC according to an embodiment of the present disclosure. On the basis of the above embodiment, in a preferred embodiment, the process of reading the sub-files and sending the sub-files to the slave BMC includes the following steps S20 to S23.

In S20, a first sub-file is read and sent to the slave BMC.

In S21, it is determined whether a return value from the slave BMC is received, and the process proceeds to S22 in a case that the return value is received.

In S22, it is determined whether there is a remaining sub-file; the process proceeds to S23 in a case that there is a remaining sub-file; and the process ends in a case that there is no remaining sub-file.

In S23, a next sub-file is read and sent to the slave BMC, and the process returns to S21.

The file is composed of a large number of bytes, and is divided to obtain multiple sub-files according to an original arrangement of the bytes. The first sub-file in step S20 refers to a part of bytes originally arranged at the head of the sequence. For example, it is assumed that one sub-file includes 128 bytes (the number of bytes in the last sub-file may be less than 128). After the file is divided, the first 128 bytes arranged at the head of the sequence form the first sub-file, and the next 128 bytes form the second sub-file, and so on, until the last sub-file is formed.

In an implementation, if the master BMC fails or the slave BMC fails during the process of sending the file, the master BMC cannot receive a return value sent by the slave BMC. That is, a determination result in step S21 is negative. In this case, the method further includes: outputting abnormal prompt message information. By adding this step, the waiting time of the master BMC can be shortened to prevent downtime from occurring. In addition, when the master BMC already sends all sub-files, an end instruction may be sent to the slave BMC or a receiving flag bit may be added to the last sub-file, so that the slave BMC can determine that all sub-files are received. Specific implementations are not limited herein.

Figure 3:
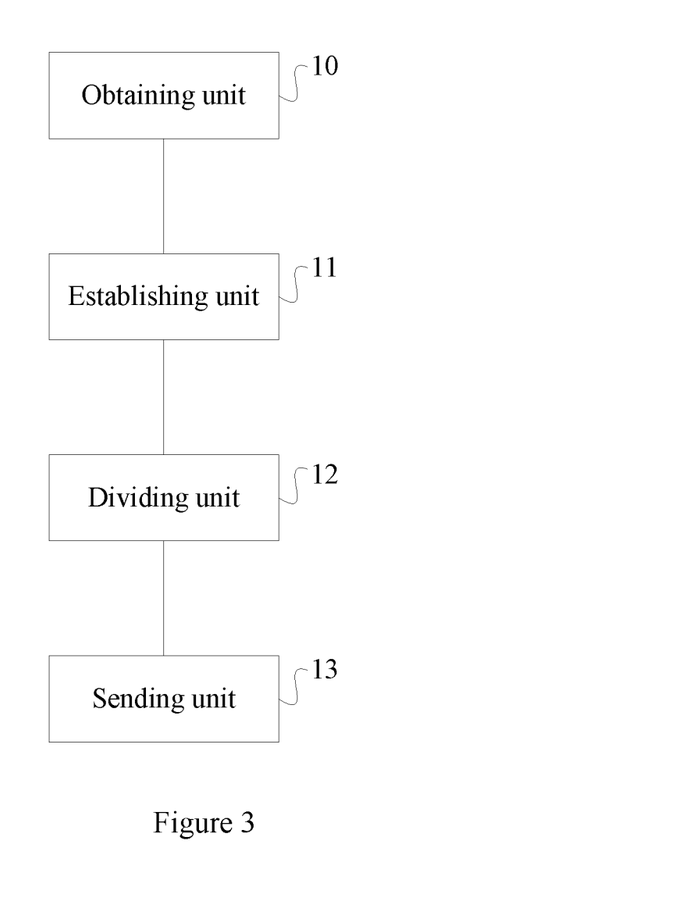
FIG. 3 is a structural diagram of a file transfer apparatus applied to a master BMC according to an embodiment of the present disclosure.

FIG. 3 is a structural diagram of a file transfer apparatus applied to a master BMC according to an embodiment of the present disclosure. In the foregoing embodiment, the file transfer method applied to the master BMC is described in detail. As shown in FIG. 3, an apparatus corresponding to the method is further provided in the present disclosure, and the apparatus is also applied to the master BMC and includes an obtaining unit 10, an establishing unit 11, a dividing unit 12 and a sending unit 13.

The obtaining unit 10 is configured to obtain a file to be transferred to a slave BMC.

The establishing unit 11 is configured to establish a communication connection with the slave BMC through an I2C bus.

The dividing unit 12 is configured to divide the file into multiple sub-files to meet transmission requirements of an IPMI.

The sending unit 13 is configured to read sub-files and send the sub-files to the slave BMC, so that the slave BMC combines the sub-files to obtain the file.

Since the apparatus embodiment corresponds to the method embodiment, for the apparatus embodiment, one may refer to the description of the method embodiment. Details are not described herein.

The file transfer apparatus between BMCs according to the embodiment of the present disclosure is configured to implement file transfer from a master BMC to a slave BMC. Firstly, a file to be transferred to the slave BMC is obtained; then a communication connection with the slave BMC is established through an I2C bus; and the file is divided into multiple sub-files to meet transmission requirements of the IPMI after the communication connection is established. Finally, the sub-files are read, and the sub-files are sent to the slave BMC, so that the slave BMC combines the sub-files to obtain the file. Since the file is divided such that each of the sub-files satisfies the transmission requirements of the IPMI, the file can be transferred without the network interface. In addition, since the I2C bus and IPMI originally exist, it is unnecessary to improve the hardware, thereby greatly saving costs.

The file transfer method between BMCs according to the embodiment of the present disclosure is described from the perspective of the modular functional entity. The file transfer device between BMCs according to an embodiment of the present disclosure is described in detail from the perspective of hardware processing below. A file transfer device between BMCs is provided according to the present disclosure, which includes a memory and a processor. The memory is configured to store a computer program.

The processor is configured to execute the computer program to implement the steps of the file transfer method between BMCs described in the foregoing embodiments.

It should be understood that the device embodiment corresponds to the method embodiment. Therefore, for the device embodiment, one may refer to the description of the method embodiment. Details are not described herein.

The file transfer device between BMCs according to the embodiment of the present disclosure is configured to implement file transfer from a master BMC to a slave BMC. Firstly, a file to be transferred to the slave BMC is obtained; then a communication connection with the slave BMC is established through an I2C bus; and the file is divided into multiple sub-files to meet transmission requirements of the IPMI after the communication connection is established. Finally, the sub-files are read, and the sub-files are sent to the slave BMC, so that the slave BMC combines the sub-files to obtain the file. Since the file is divided such that each of the sub-files satisfies the transmission requirements of the IPMI, the file can be transferred without the network interface. In addition, since the I2C bus and IPMI originally exist, it is unnecessary to improve the hardware, thereby greatly saving costs.

A computer readable storage medium is further provided in the present disclosure. A computer program is stored in the computer readable storage medium; and when the computer program is executed by the processor, the steps of the file transfer method between BMCs described in the above embodiments are implemented.

Since the apparatus embodiment corresponds to the method embodiment, for the apparatus embodiment, one may refer to the description of the method embodiment. Details are not described herein.

The functional units in the various embodiments of the present disclosure may be integrated into one processing unit, or all units may exist physically separately, or two or more units may be integrated into one unit. The above integrated unit may be implemented in the form of hardware or in the form of a software functional unit. The integrated unit, if implemented in the form of a software functional unit and sold or used as an independent product, may be stored in a computer readable storage medium. Based on such understanding, the essence of the technical solution of the present disclosure, a part of the technical solutions contributing to the conventional art, or all or a part of the technical solution, may be embodied in the form of a software product. The computer software product is stored in a storage medium and configured to implement the above method when executing the stored program. The foregoing storage medium includes various media which can store program codes, such as a U disk, a mobile hard disk, a read-only memory (ROM), a random access memory (RAM), a magnetic disk, or an optical disk.

The computer storage medium according to the embodiment of the present disclosure stores application programs of the file transfer method between BMCs, to implement file transfer from a master BMC to a slave BMC. Firstly, a file to be transferred to the slave BMC is obtained; then a communication connection with the slave BMC is established through an I2C bus; and the file is divided into multiple sub-files to meet transmission requirements of the IPMI after the communication connection is established. Finally, the sub-files are read, and the sub-files are sent to the slave BMC, so that the slave BMC combines the sub-files to obtain the file. Since the file is divided such that each of the sub-files satisfies the transmission requirements of the IPMI, the file can be transferred without the network interface. In addition, since the I2C bus and IPMI originally exist, it is unnecessary to improve the hardware, thereby greatly saving costs.

Figure 4:
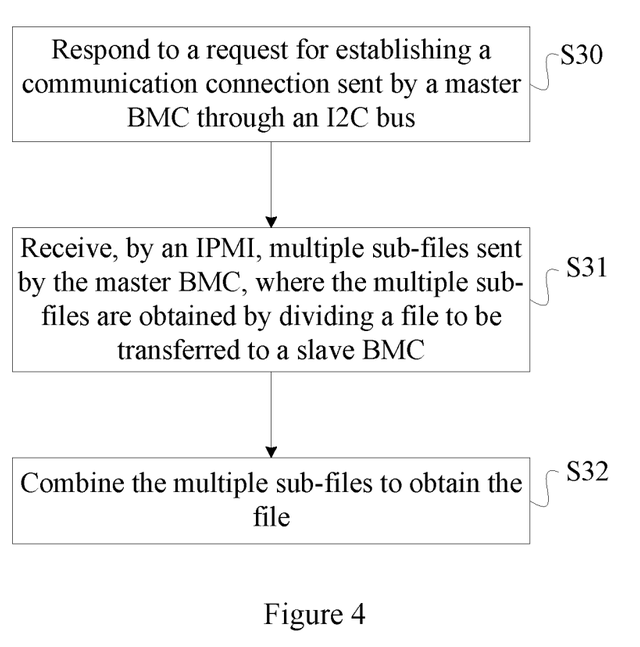
FIG. 4 is a flowchart of a file transfer method applied to a slave BMC according to an embodiment of the present disclosure.

FIG. 4 is a flowchart of a file transfer method applied to a slave BMC according to an embodiment of the present disclosure. In the above multiple embodiments, the file transfer between the BMCs is described from the perspective of the master BMC. A file transfer method between BMCs applied to the slave BMC is further provided in the present disclosure. As shown in FIG. 4, the method includes the following steps S30 to S32.

In S30, a request for establishing a communication connection sent by a master BMC through an I2C bus is responded.

In S31, multiple sub-files sent by the master BMC are received through an IPMI. The multiple sub-files are obtained by dividing a file to be transferred to the slave BMC.

In S32, the multiple sub-files are combined to obtain the file.

It should be noted that, the slave BMC mainly cooperates with operations performed by the master BMC. For the steps performed by the master BMC, one may refer to the above description.

In S31, the multiple sub-files are sequentially obtained by the slave BMC, and each sub-file is required to meet the transmission requirement of the IPMI. For the IPMI, the number of bytes in data to be transmitted cannot exceed 128, otherwise the transmission cannot be completed. Therefore, for any sub-file, the number of bytes is no more than 128. It can be understood that the number of bytes of sub-files may be the same or different. For example, a file is divided into i sub-files each containing 128 bytes and one sub-file containing j bytes. The sub-files received by the slave BMC correspond to the sub-files obtained by dividing by the master BMC. The multiple sub-files are combined according to a sequential order to obtain a complete file.

It should be noted that if the sub-files are sent by the master BMC according to an original byte arrangement order in the file, the slave BMC is required to record the order of the received sub-files, or arranges the multiple sub-files according to an order in which the sub-files are received. Otherwise, in a case that the multiple sub-files are combined in an incorrect order, the obtained file is wrong, and the specific function cannot be achieved. For example, the firmware upgrade cannot be completed.

In consideration of a reading speed, the slave BMC may store the obtained sub-files in a memory buffer.

Since the method for the slave BMC corresponds to the method for the master BMC, the method for the slave BMC is not described in detail. For the details, one may refer to the above description.

In the file transfer method between BMCs applied to the slave BMC according to the embodiment of the present disclosure, firstly, a request for establishing a communication connection sent by a master BMC through an I2C bus is responded; then multiple sub-files sent by the master BMC are received through an IPMI, where the multiple sub-files are obtained by dividing a file; and the multiple sub-files are combined to obtain a complete file when all of the sub-files are received. Since the file is divided such that each of the sub-files satisfies the transmission requirements of the IPMI, the file can be transferred without the network interface. In addition, since the I2C bus and IPMI originally exist, it is unnecessary to improve the hardware, thereby greatly saving costs.

Figure 5:
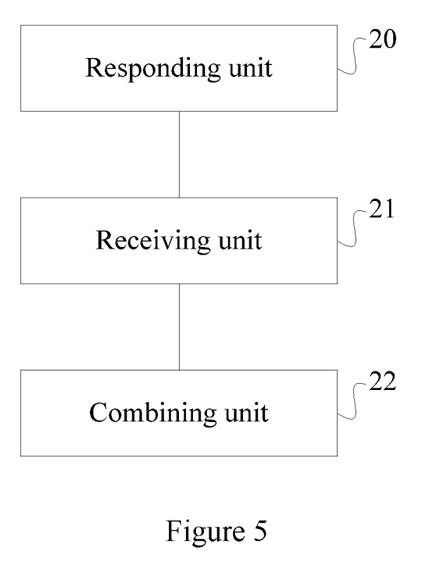
FIG. 5 is a structural diagram of a file transfer apparatus applied to a slave BMC according to an embodiment of the present disclosure.

Finally, a file transfer apparatus between BMCs applied to a slave BMC is further provided according to an embodiment of the present disclosure. FIG. 5 is a structural diagram of a file transfer apparatus applied to the slave BMC according to an embodiment of the present disclosure. The apparatus includes: a responding unit 20, a receiving unit 21 and a combining unit 22.

The responding unit 20 is configured to respond to a request for establishing a communication connection sent by a master BMC through an I2C bus.

The receiving unit 21 is configured to receive, through an IPMI, multiple sub-files sent by the master BMC. The multiple sub-files are obtained by dividing a file to be transferred to the slave BMC.

The combining unit 22 is configured to combine the multiple sub-files to obtain the file.

With the file transfer apparatus between BMCs applied to the slave BMC according to the embodiment of the present disclosure, firstly a request for establishing a communication connection sent by a master BMC through an I2C bus is responded; then multiple sub-files sent by the master BMC are received through an IPMI, where the multiple sub-files are obtained by dividing a file; and the multiple sub-files are combined to obtain a complete file when all of the sub-files are received. Since the file is divided such that each of the sub-files satisfies the transmission requirements of the IPMI, the file can be transferred without the network interface. In addition, since the I2C bus and IPMI originally exist, it is unnecessary to improve the hardware, thereby greatly saving costs.

It should be noted that the application program corresponding to the file transfer method between BMCs applied to the slave BMC may be stored in the form of a computer storage medium, and details are not described herein again.

The file transfer method, apparatus, device between BMCs and the storage medium according to the present disclosure are described in detail above. The embodiments in the specification are described in a progressive way, and each embodiment lays emphasis on differences from other embodiments. For the same or similar parts between various embodiments, one may refer to the description of other embodiments. For the apparatus disclosed in the embodiment, since it corresponds to the method disclosed in the embodiment, the description of the apparatus is relatively simple. For the relevant parts, one may refer to the description the method embodiments. It should be noted that, those skilled in the art can make various improvements and modifications to the present disclosure without departing from principles of the present disclosure. The improvements and modifications also fall within the protection scope of claims of the present disclosure.

It should further be noted that in the present specification, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof intend to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device.

The invention claimed is:

1. A file transfer method between BMCs, applied to a master BMC, comprising:
   obtaining a file to be transferred to a slave BMC;
   establishing a communication connection with the slave BMC through an I2C bus;
   dividing the file into a plurality of sub-files to meet transmission requirements of an IPMI; and
   reading the sub-files and sending the sub-files to the slave BMC, wherein the slave BMC combines the sub-files to obtain the file,
   wherein the reading the sub-files and sending the sub-files to the slave BMC comprises:
   reading a first sub-file and sending the first sub-file to the slave BMC;
   determining whether a return value from the slave BMC is received;
   determining whether there is a remaining sub-file if the return value is received;
   reading a next sub-file, sending the next sub-file to the slave BMC, and determining again whether a return value from the slave BMC is received, if there is a remaining sub-file; and
   ending if there is no remaining sub-file.

2. The file transfer method between BMCs according to claim 1, wherein the obtaining a file to be transferred to a slave BMC comprises: obtaining a file to be transferred to the slave BMC from a memory buffer.

3. The file transfer method between BMCs according to claim 1, wherein the establishing a communication connection with the slave BMC through an I2C bus comprises:
   establishing a communication session with the slave BMC through the I2C bus; and
   sending a test command on the IPMI to the slave BMC to determine that the communication connection with the slave BMC is successfully established.

4. The file transfer method between BMCs according to claim 1, wherein the dividing the file into a plurality of sub-files comprises: dividing the file by taking 128 bytes as a unit to obtain the plurality of sub-files.

5. A computer readable storage medium storing a computer program, wherein the computer program is executed by a processor to implement the file transfer method between BMCs according to claim 1.

6. A file transfer device between BMCs, comprising:
   a memory, configured to store a computer program; and
   a processor, configured to execute the computer program to implement operations of:
   obtaining a file to be transferred to a slave BMC;
   establishing a communication connection with the slave BMC through an I2C bus;
   dividing the file into a plurality of sub-files to meet transmission requirements of an IPMI; and reading the sub-files and sending the sub-files to the slave BMC, wherein the slave BMC combines the sub-files to obtain the file, wherein the reading the sub-files and sending the sub-files to the slave BMC comprises:

reading a first sub-file and sending the first sub-file to the slave BMC;

determining whether a return value from the slave BMC is received;

determining whether there is a remaining sub-file if the return value is received;

reading a next sub-file, sending the next sub-file to the slave BMC, and determining again whether a return value from the slave BMC is received, if there is a remaining sub-file; and ending if there is no remaining sub-file.

7. The file transfer device between BMCs according to claim 6, wherein the obtaining a file to be transferred to a slave BMC comprises: obtaining a file to be transferred to the slave BMC from a memory buffer.

8. The file transfer device between BMCs according to claim 6, wherein the establishing a communication connection with the slave BMC through an I2C bus comprises:

establishing a communication session with the slave BMC through the I2C bus; and sending a test command on the IPMI to the slave BMC to determine that the communication connection with the slave BMC is successfully established.

9. The file transfer device between BMCs according to claim 6, wherein the dividing the file into a plurality of sub-files comprises: dividing the file by taking 128 bytes as a unit to obtain the plurality of sub-files.

* * * * *